United States Patent [19]

Ellis et al.

[11] 4,201,736
[45] May 6, 1980

[54] FLUID DISTRIBUTION AND CONTACTING ELEMENTS

[76] Inventors: Stephen R. Ellis, 63 Shelly Wick Rd., Birmingham, England, B29 7JE; Theodore R. Bott, 17 Springavon Croft, Harborne, Birmingham, England, B17 9BJ; Howard E. Kay, Sherwood Rd., Hall Green, Birmingham, England, B28 9HB; Noel Hughes, The Spinney, Tyddesley Wood, Pershore, England

[21] Appl. No.: 885,800

[22] Filed: Mar. 13, 1978

[51] Int. Cl.² ............................................. B01F 3/04
[52] U.S. Cl. ............................................. 261/98; 55/90; 202/158; 261/DIG. 72; 422/211
[58] Field of Search .................... 261/94–98, 261/DIG. 72, 112; 210/150, 151; 55/90; 202/158; 29/505

[56] References Cited

U.S. PATENT DOCUMENTS

| B 480,702 | 1/1976 | Lerner | 261/98 |
|---|---|---|---|
| 522,549 | 7/1894 | Barnard | 261/DIG. 72 |
| 1,327,422 | 1/1920 | Darier | 261/DIG. 72 |
| 2,072,560 | 3/1937 | Kranz et al. | 29/505 |
| 2,135,703 | 11/1938 | Fenske | 261/DIG. 72 |
| 3,438,614 | 4/1969 | Lipinski | 261/DIG. 72 |
| 3,526,034 | 9/1970 | Beurrier | 29/505 X |

FOREIGN PATENT DOCUMENTS 420281 11/1934 United Kingdom ............ 261/DIG. 72

Primary Examiner—Richard L. Chiesa
Attorney, Agent, or Firm—Marshall & Yeasting

[57] ABSTRACT

A packing element for a fluid-fluid, fluid-solid, contacting de-entrainment or reaction apparatus is made from wire using two or more parallel wires which are loosely twisted together, the twisted bundle then being wound into a helix, and the helix then being twisted about a second pair of heavier gauge wires which form a core, so that the individual loops of the helix are spaced helically about the central core, the individual wires being slightly separated from one another to form gaps which can be bridged by a liquid, and encourage capillary flow so as to wet the whole of the packing area.

11 Claims, 5 Drawing Figures

FLUID DISTRIBUTION AND CONTACTING ELEMENTS

This invention relates to articles suitable for use as packing elements in a tower, column or chemical reaction vessel so as to enhance interaction between fluids, or a fluid and a solid, moving in counter-current or co-current flow through the tower or column or to de-entrain solid or fluid from a fluid flow through the tower or column, as required in, for example, fractionation, distillation, absorption, humidification, liquid-liquid extraction, chemical reaction etc.

According to a first aspect of the invention we provide in fluid-fluid or fluid-solid contacting de-entrainment or reaction apparatus, a column, which may extend substantially vertically, or reactor vessel, and a plurality of the articles distributed randomly within said column or vessel, said articles comprising at least two elongate members twisted together to form a central core, and a plurality of convolutions having portions thereof trapped within the gaps between the core members and held thereby in a configuration such that the convolutions collectively extend in helical fashion about the central core.

The core members are conveniently constituted by lengths of wire or alternatively a single length of wire bent at one or more positions intermediate its ends to provide two or more substantially coextensive portions. The convolutions are preferably formed from a plurality of filaments of, for example, wire, which may be of round section of non-round section, for example semicircular, square or rectangular section, each filament forming a respective loop portion of each convolution. The filaments may all be of the same material, for example, wire, or different materials, for example, wire, plastics material or glass fibre. In some instances, the convolutions may be formed from a single filament, e.g. for certain specific de-entrainment applications, but otherwise it is preferred to use a plurality of filaments which may be intertwined, e.g. twisted together, and the number of filaments may be for example between 3 and 9 and preferably is 5–6.

The convolutions may be of generally circular configuration including the possibility of joining a loop from a crimped element so that the loop is a multipointed star shape but other configurations, formed from linear or crimped wire, for example, square, are possible. The central core defined by said twisted members may be generally rectilinear or it may be arcuate or consist of a number of angularly related sections so as to adopt an open or closed loop configuration or a sinous configuration.

According to a second aspect of the invention we provide an article for use as a packing element, said article comprising at least two elongate members twisted together to form a central core, and a plurality of convolutions having portions thereof trapped within the gaps between the core members and held thereby in a configuration such that the convolutions collectively extend in helical fashion about the central core, characterised in that each convolution comprises at least two loop portions.

According to a further aspect of the invention we provide a method of making an article or articles suitable for use as packing elements, said method comprising assembling a plurality of filaments together to make a bundle, winding the bundle to make a coil, and locating first and second core members within and without the coil so as to extend generally parallel to the axis of the same, and twisting the core members so that the convolutions of the coil extend in generally helical fashion about the twisted core members, with the filaments of each convolution intertwined with each other.

The initial twisting to form the bundle (where this is done as a first step) may be relatively loose so that, in the final product, the filament portions defining each convolution separate slightly from one another and are effective to entrain fluid therebetween by a capillary wetting action. The product of the method may be formed in a length suitable for immediate use as a packing element (after manipulation to form an open or closed loop configuration or a sinuous configuration if desired) or alternatively the product may be made of great length and subsequently severed into a number of shorter lengths suitable for use in a column.

In a modification, for use for example in making packing elements for certain specific de-entrainment application, the above-defined method is simplified by using a coil wound from a single filament.

In a further modification, two pre-coiled single filaments may be put together, and a core wire inserted through each coil, and the two core wires twisted together to like effect.

As mentioned previously, the filaments may be of metal wire of round or other section. The dimensions of the filaments, the convolutions formed thereby and the core members are selected to provide a large surface area for fluid contact within a given volume of the tower or column. Preferably the diameter and transverse dimensions of the filaments will be less than those of the core members but to avoid maldistribution effects the core members will have a relatively small diameter otherwise there may be a pronounced tendency for fluid flow to take place along the central core.

The hardness and resilience of the metal used for the filaments may depend upon the required application, but in general these parameters will be higher for the filaments than for the core members so as to ensure that the filaments spread and separate very slightly from one another in the finished product.

In order to improve the degree of fluid contact, the wettability of the convolutions of the packing elements may be enhanced by coating, covering or treating the same with a material having good wettability properties. Thus, for example, each filament may be enclosed within a sheath of woven glass fibre, the interstices between the woven fibres serving to retain fluid on the convolutions of the packing elements, or the filaments may be etched.

Reference is now made to FIGS. 1 to 5 of the accompanying drawings to illustrate the invention.

Figure 1:
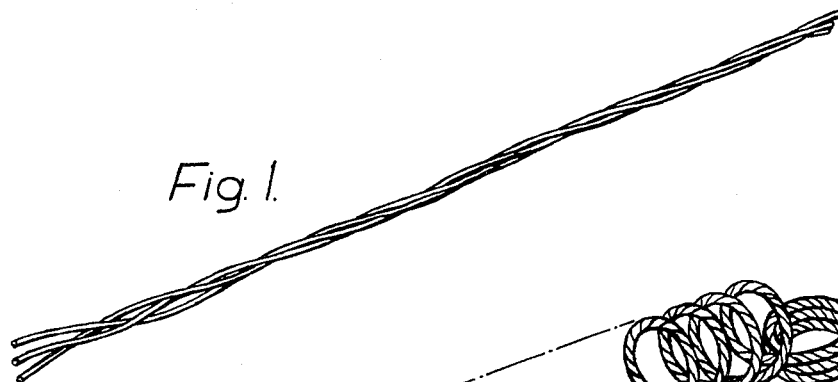
FIG. 1 shows a bundle of, in this case, three filaments loosely entrained to form a bundle.
Figure 2:
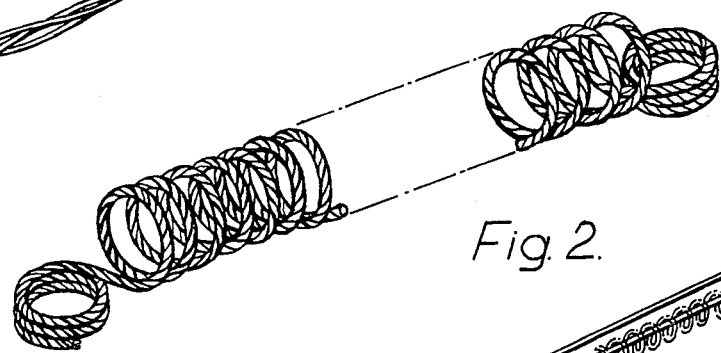
FIG. 2 shows the next stage in which the bundle has been wound into a loose coil with eyes at each end for convenience in the subsequent steps.
Figure 3:
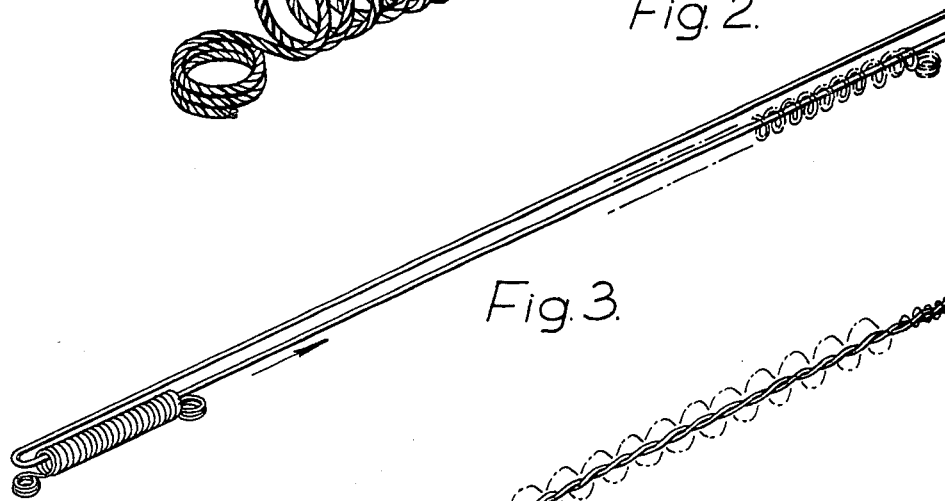
Figure 4:
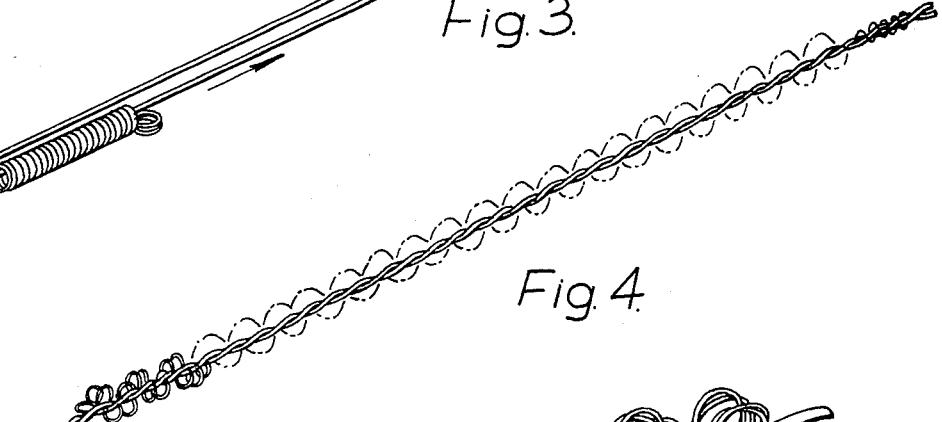
Figure 5:
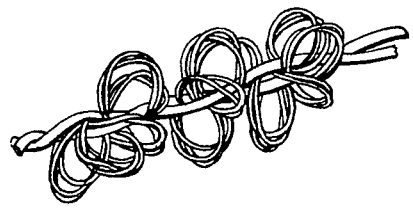

FIG. 3 shows the provision of a U-shaped length of wire having one limb within and the other limb without the coil. The limbs of the U-shaped wire are twisted around one another to trap the coil convolutions therebetween and cause them to be displaced about the central core in helical fashion as shown in FIGS. 4 and 5. It will be seen from FIG. 5 that the individual filament portions defining each convolution are separated from one another to provide a capillary action, and the end eyes may be cut-off.

The product of the above steps is finally severed into a plurality of discrete parts which may then be packed randomly within the column of a fluid contacting or de-entrainment apparatus.

Typically severed portions when of substantially rectilinear configuration will be about 38 mm in length. In the example, the article was formed from a bundle of three wires each 0.32 mm diameter twisted together with a left hand lay of about 8 mm and the bundle so formed was wound to form a coil of approximately 9 mm outside diameter. The diameter of the length of core wire was approximately 0.5 mm. It was found that elements having these dimensions could be packed firmly, and randomly, within a column of for example nine inches diameter, without any significant interlocking between the elements thereby allowing ready removal thereof for re-use.

Experimental work has been carried out to compare the efficiency of the packing elements according to the present invention with known packing elements and it has been found that significant improvements are obtained both with elements produced from two filaments, three filaments and five filament bundles, the more significant improvement being obtained with higher members.

It is believed that five to six filaments represents an economic optimum. Moreover, the experimental results show substantial consistency, that is to say the results are repeatable when the elements are removed and repacked. Using straight lengths of the elements it is found that the random packing produces a high proportion disposed generally horizontally or at small angles to the horizontal.

It is thought that the improvements stem from the relatively large surface area provided for fluid contact by the multi-filament convolutions both in terms of the actual surface area of material available and by virtue of the aforesaid capillary wetting action. A notable feature apparent from the experiments made is that the pressure drop across the mass of packing elements is relatively low compared with conventional packing arrangements and furthermore it has been found that the packing elements according to the invention provide good efficiency even at low reflux ratios (i.e. liquid to vapour ratio of <0.5 to 0.8) in, for example, an ethyl alcohol-propyl alcohol system. The packings of the invention have a wide application and are particularly suitable where low pressure drop is important as in vacuum distillation and for those cases of absorption where the liquid rate is low and the gas or air flow high.

Whilst significant improvements have been obtained using multi-filament convolutions, it is contemplated that improvements may be obtained with single wire filament convolutions if the filament is either coated or sheathed with a material such as glass fibre to improve the wettability thereof, or if the filament is composed of a material having good wettability properties.

It will be understood that the packing elements could be made by a method other than that described above; in particular they could be made in automatic or semi-automatic machinery in continuous length and out into pieces, and in such case the end loops needed for the illustrated method would not be required.

Examples of experimental results using the invention are as follows:

EXAMPLE 1

A 9 inch diameter column of 4.5 ft height was used for fractionating methylcyclohexane toluene of total reflux and at a boil-up rate of 800 lbs/ft$^2$-hour. The column was packed with elements as in FIG. 5, but made with 5 filaments and in 1.5 inch lengths. The total pressure drop was 0.25 inches water gaguge, and the HETP (Height Equivalent to Theoretical Plate) was 8.5 inches.

By comparison, 1" diameter metal pall rings used as packings in the same column/system gave a HETP of 10 inches, and a pressure drop of 0.5 inches.

EXAMPLE 2

In a 6" column of 3 ft height, with the same 5 filament packing elements, fractionating ethyl alcohol—a propyl alcohol at total reflux and a boil-up rate of 250 lbs/ft$^2$ low, the HETP was 8 inches. In comparison $\frac{3}{8}$" metal pall rings in the same system gave a HETP of 11 inches. The packings of the invention gave a pressure drop of 0.08 inches of water/foot height at an air loading of 1000 lbs/ft$^2$ hour, and 0.26 inch water/ft at 2000 lbs/ft$^2$ hour of air. The pall rings comparison figures were 0.25 inches water/ft and 1.1 inch of water/ft respectively.

Where two pre-coiled (but separate) filaments are assembled together, they may be widely different diameter convolutions. This, as with an untwisted bundle of filaments which is processed generally as directed, may lead to more widely separated filaments in the final article. This may be of advantage for heat transfer work, for use as a turbulator, or for removal of solids or droplets from air or gases.

A further example of the use of the packing elements of the invention, is in connection with the mixing of gases, particularly where the ratio of one gas to the other is high, and the mixing is to be carried out in a short length of passage through which the gases flow, with a minimum of pressure drop. The packing element in this case is used effectively as a turbulator.

We claim:

1. An article for use as a packing element or turbulator, said article comprising at least two elongate core members twisted together to form a central core with gaps between the core members, and a plurality of convolutions comprising a plurality of filaments and having portions thereof trapped within the gaps between the core members and held thereby in a configuration such that the convolutions collectively extend in helical fashion about the central core.

2. Reaction apparatus, column or vessel as claimed in claim 1, wherein said articles comprise a wire core.

3. An article for use as a packing element of turbulator, said article comprising at least two elongate core members twisted together to form a central core with gaps between the core members, and a plurality of convolutions comprising a plurality of filaments and having portions thereof trapped within the gaps between the core members and held thereby in a configuration such that the convolutions collectively extend in helical fashion about the central core, characterised in that each convolution comprises at least two loop portions.

4. An article as claimed in claim 3 wherein said two elongate members are of a metal wire.

5. An article as claimed in claim 3 or claim 4 wherein said at least two loop portions are intertwined.

6. An article as claimed in claim 3 or claim 4 wherein three or more intertwined loop portions are provided.

7. An article according to claim 3 wherein five intertwined loop portions are provided.

8. An article as claimed in claims 3 or 4 wherein the intertwined loop portions are formed from filaments of round cross-section.

9. An article as claimed in claims 3 or 4 wherein the intertwined loop portions are formed of non-circular filaments.

10. An article as claimed in claims 3 or 4 wherein the said core is generally rectilinear.

11. An article according to claims 3 or 4 wherein said core is non-rectilinear.

* * * * *